US011954711B2

(12) United States Patent
Tchibirev et al.

(10) Patent No.: US 11,954,711 B2
(45) Date of Patent: *Apr. 9, 2024

(54) AUTOMATED METHOD FOR CAUSING AD CONTENT THAT HAS NOT YET APPEARED IN A VIEWPORT OF A BROWSER WINDOW TO BE DISPLAYED WITHIN A WEB CONTENT PAGE AND SELECTIVELY ALLOWING THE AD CONTENT TO LINGER IN VIEW FOR A PREDETERMINED MINIMUM AMOUNT OF TIME DURING VIEWING OF THE WEB CONTENT PAGE

(71) Applicant: Rich Media Club, LLC, Salt Lake City, UT (US)

(72) Inventors: Igor Tchibirev, Sea Cliff, NY (US); Brad Krassner, Salt Lake City, UT (US)

(73) Assignee: RICH MEDIA CLUB, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,848

(22) Filed: Apr. 14, 2023

(65) Prior Publication Data

US 2023/0252529 A1 Aug. 10, 2023

Related U.S. Application Data

(62) Division of application No. 17/964,485, filed on Oct. 12, 2022, now Pat. No. 11,631,115.

(60) Provisional application No. 63/255,377, filed on Oct. 13, 2021, provisional application No. 63/255,005, filed on Oct. 12, 2021.

(51) Int. Cl.
G06Q 30/0241 (2023.01)
G06Q 30/0272 (2023.01)

(52) U.S. Cl.
CPC ..... *G06Q 30/0277* (2013.01); *G06Q 30/0272* (2013.01)

(58) Field of Classification Search
CPC .............. G06Q 30/0277; G06Q 30/0272
USPC ...... 705/14.73, 14.69, 14.55, 14.6; 709/219; 725/105
See application file for complete search history.

(56) References Cited

U.S. PATENT DOCUMENTS

| | | | |
|---|---|---|---|
| 7,725,502 B1 * | 5/2010 | Badros | G06Q 30/0277 709/219 |
| 10,380,597 B2 | 8/2019 | Krassner et al. | |
| 10,380,602 B2 | 8/2019 | Krassner et al. | |
| 11,004,090 B2 | 5/2021 | Krassner et al. | |
| 11,443,329 B2 | 9/2022 | Krassner et al. | |

(Continued)

OTHER PUBLICATIONS

Optimization Glossary, Ad Viewability, 2021 (Year: 2021).*

(Continued)

*Primary Examiner* — Tarek Elchanti
(74) *Attorney, Agent, or Firm* — Panitch Schwarze Belisario & Nadel LLP

(57) ABSTRACT

As a viewer views and scrolls down a web content page in a browser window of a web browser, ad content for a particular ad placement area of the web content page that has been rendered and has not yet appeared in a viewport of the browser window is moved to a fixed position in the viewport. The ad content remains in this fixed ad placement area for a predetermined time period, thereby lingering in the viewport despite any scrolling of the web content page.

3 Claims, 12 Drawing Sheets

(56) References Cited

U.S. PATENT DOCUMENTS

| | | |
|---|---|---|
| 11,468,453 B2 | 10/2022 | Krassner et al. |
| 2008/0221982 A1* | 9/2008 | Harkins ............ G06Q 30/0238 |
| | | 705/14.69 |
| 2011/0035263 A1 | 2/2011 | Ramanathan |
| 2011/0082755 A1 | 4/2011 | Itzhak |
| 2012/0022926 A1 | 1/2012 | Ramanathan |
| 2012/0272278 A1* | 10/2012 | Bedi ............... H04N 21/25435 |
| | | 725/105 |
| 2013/0238433 A1 | 9/2013 | Kamdar |
| 2014/0089110 A1 | 3/2014 | Kazama |
| 2014/0229268 A1 | 8/2014 | Clapp et al. |
| 2014/0344055 A1* | 11/2014 | Sanghavi .......... G06Q 30/0272 |
| | | 705/14.55 |
| 2015/0058114 A1 | 2/2015 | Yi |
| 2016/0042397 A1* | 2/2016 | Okuno .............. G06Q 30/0263 |
| | | 705/14.6 |
| 2016/0125453 A1 | 5/2016 | Shukla et al. |
| 2017/0103430 A1 | 4/2017 | Gilbert |
| 2017/0140437 A1 | 5/2017 | Bhat |
| 2017/0323351 A1 | 11/2017 | Owens et al. |
| 2020/0159816 A1 | 5/2020 | Bostrom et al. |

OTHER PUBLICATIONS

MRC Viewable Ad Impression Measurement Guidelines. Prepared in collaboration with IAB Emerging Innovations Task Force, Version 1.0 (Final)—Jun. 30, 2014, 14 pages.

CSS position property, W3Schools, downloaded from web page: <https://www.w3schools.com/cssref/pr_class_position.asp>, download date: Oct. 6, 2022, original posting date: unknown, 6 pages.

Forbes.com Self-Service Advertising Platform, downloaded from <https://web.archive.org/web>. . . , Nov. 30, 2016, 2 pages.

Petition for Inter Partes Review for U.S. Pat. No. 11,443,329 filed May 24, 2023.

\* cited by examiner

AUTOMATED METHOD FOR CAUSING AD CONTENT THAT HAS NOT YET APPEARED IN A VIEWPORT OF A BROWSER WINDOW TO BE DISPLAYED WITHIN A WEB CONTENT PAGE AND SELECTIVELY ALLOWING THE AD CONTENT TO LINGER IN VIEW FOR A PREDETERMINED MINIMUM AMOUNT OF TIME DURING VIEWING OF THE WEB CONTENT PAGE

CROSS-REFERENCE TO RELATED APPLICATIONS

This application is a divisional of copending U.S. application Ser. No. 17/964,485 filed Oct. 12, 2022, which is incorporated by reference herein.

This application claims the benefit of U.S. Provisional Patent Application Nos. 63/255,005 filed Oct. 12, 2021 and 63/255,377 filed Oct. 13, 2021, the entire disclosures of which are incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates to systems and methods for the enhancement of advertising effectiveness and the reliability of advertising investments and other media viewing effectiveness.

2. Background

Displaying ad content within a web content page when viewing the web content page in a browser window of a web browser is well-known in the art. For example, U.S. Pat. No. 11,443,329 (Krassner et al.) discloses an example of ad content delivery within web content pages. In one well-known prior art scenario, the web content page is scrollable to allow a portion of the web content page to appear in a "viewport" of the browser window. When viewing a document in a web browser, the viewport is the region of the browser window which contains the visible portion of the document. If the document is larger than the viewport, the user can control the portion of the document which is visible by scrolling in the viewport.

It is also well-known for a web content page to include a plurality of ad placement areas, and for only a subset of the ad placement areas to appear at one time in the viewport of the browser window during scrolling of the web content page due to the web content page being larger than the viewport. (Scrolling is typically vertical but can also be horizontal.) The ad content is populated into respective ad placement areas. Accordingly, only the ad content that is populated into an ad placement area that appears in the viewport of the browser window is visible to a viewer of the browser window.

One disadvantage of this ad content delivery process is that a viewer may scroll down a web content page so quickly that one or more of the ad contents are not within the viewport for a sufficient time period to make the expected viewable ad impression ("viewable impression") on the viewer. (A "viewable impression" in accordance with industry guidelines set forth in "MRC Viewable Ad Impression Measurement Guidelines" (Version 1.0 dated Jun. 30, 2014) occurs when the ad content is actually loaded, rendered and is within the viewport of the browser window for at least 1 consecutive second.) That is, the advertiser has paid to have the ad delivered, the ad was actually rendered by the browser and thus technically available to the viewer, but the ad did not appear in the viewport for a sufficient amount of time to make a sufficiently suitable viewable impression on the viewer. In some scenarios, latency issues caused by ad auctions, ad servers, and the ad delivery processes may even prevent the ad content from populating the ad placement space at all before the viewer has scrolled past the ad placement space. In this scenario, the advertiser has also paid to have the ad delivered, but the ad was never actually exposed to the viewer, even for a brief period of time so no viewable ad impression is made.

The prior art for the present invention includes ad display technology used by Forbes.com that partially addresses this problem. When top leaderboard ads appear on a Forbes.com web content page, the leaderboard ad content remains on the web page for a predetermined period of time, regardless of whether the viewer scrolls down the web page. The leaderboard ad content eventually disappears, thereby expanding the space available on in the viewport for showing non-ad web content. Web pages that appear in Forbes.com typically include additional ad placement spaces but the feature applied to the leaderboard ad is not applied to the other ad placement spaces and their respective ad content. Accordingly, the solution provided by Forbes.com only partially addresses the problems in the art that are highlighted above.

Preferred embodiments of the present invention more fully address this disadvantage with technology solutions that do not require the advertiser to purchase a leaderboard ad to receive the benefit of a guaranteed viewable impression time period on a web content page, regardless of viewer scrolling activity.

BRIEF DESCRIPTION OF THE DRAWINGS

To facilitate further description of the embodiments, the following drawings and descriptions, which should not be considered limiting in any way, are provided. The drawings do not illustrate every embodiment of the present invention. With reference to the accompanying drawings, like elements are numbered alike.

SUMMARY OF THE INVENTION

Embodiments of systems and methods for the enhancement of advertising effectiveness and the reliability of advertising investments and other media viewing effectiveness. More specifically, embodiments comprise systems and methods for extending or maintaining the viewability of certain media on a user viewing screen.

DETAILED DESCRIPTION

Certain terminology is used herein for convenience only and is not to be taken as a limitation on the present invention. The words "a" and "an", as used in the claims and in the corresponding portions of the specification, mean "at least one."

One preferred embodiment of the present invention is implemented via software code shown below. The software code is subject to the "Copyright Notice and Authorization" stated above.

This patent application includes an Appendix having a file named "appendix689752-6U3.txt" created on Apr. 10, 2023 and having a size of 18,233 bytes. The Appendix is incorporated by reference into the present patent application. One preferred embodiment of the present invention is implemented via the source code in the Appendix. The Appendix is subject to the "Copyright Notice and Authorization" stated above.

The present invention provides systems and methods for the enhancement of advertising effectiveness and the reliability of advertising investments and other media viewing effectiveness as well as enhancing ad viewer experiences. More specifically, certain embodiments comprise systems and methods for increasing the viewability of certain media on a user viewing screen. Certain embodiments may initiate rendering of an ad in a viewer viewport, may extend the time an ad is rendered in a viewer viewport, may maintain an ad in view in a viewer viewport and/or otherwise increase the viewability of an ad by a viewer.

In some embodiments, the present invention provides systems and methods that affect certain portions of the media rendered on a viewer screen such that certain portions of the media remain within a viewable area of the viewer screen for an enhanced, altered, or predefined period of time. In some instances it is preferred that certain media, such as advertising content, on a viewer screen (including a web page or other application rendered on the viewer screen) remain viewable for a predetermined period of time.

The Figures illustrate aspects of certain embodiments of the present invention.

Figure 1:
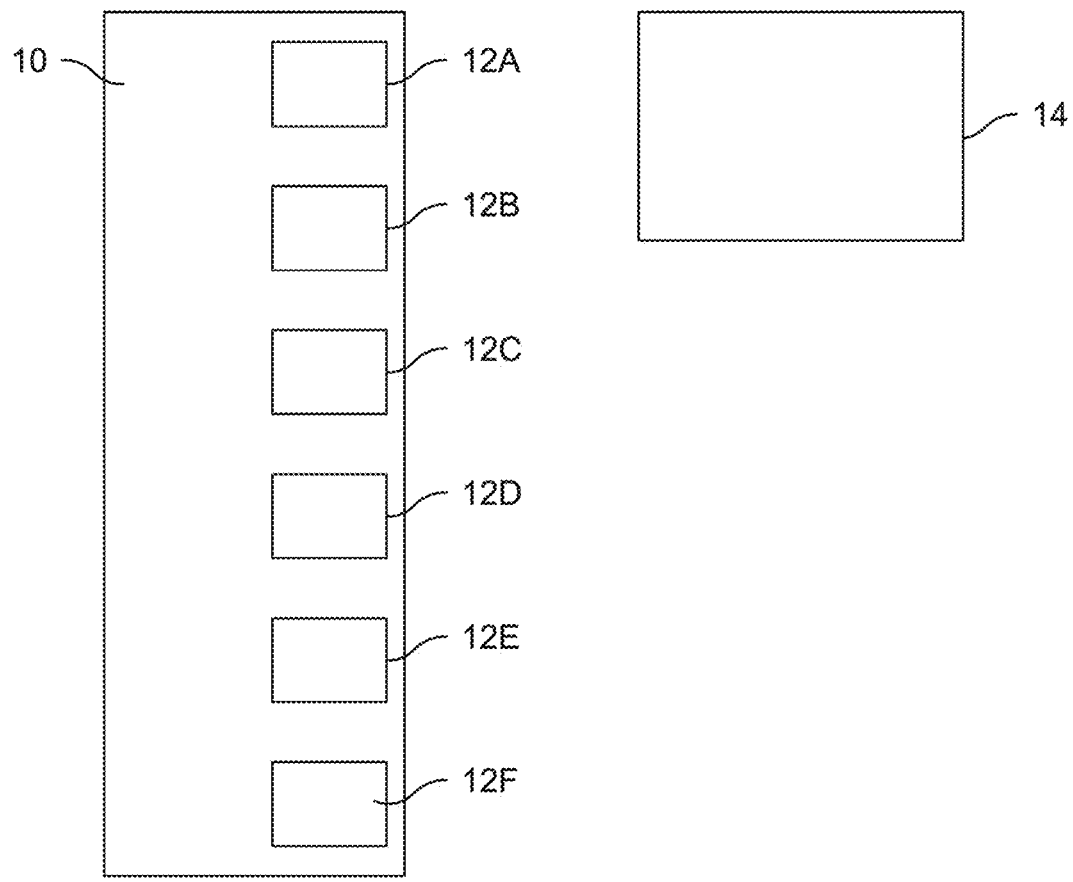
FIG. 1 illustrates an example of a display screen and content page according to certain embodiments of the present invention.

FIG. 1 shows a schematic of an exemplary web content page 10 as may be published to a viewer computing device such as when the appropriate URL request for the web content page 10 is sent, such as when a viewer transmits the URL request from the viewer computing device. Shown in FIG. 1 is exemplary web content page 10 and associated exemplary predetermined ad placement spaces (or areas) 12A-12F. The respective exemplary predetermined ad placement spaces 12A-12F may be positioned in respective predefined coordinate locations in relation to the coordinate system of the content page 10. The web content page 10 with the predetermined ad placement spaces 12 as shown may be termed to be part of the page layout. Also shown in FIG. 1 is an exemplary screen of a viewer computing device (not shown) having a viewable area 14. The exemplary predetermined ad placement area 12A-12F may be positioned on content page 10 with position data that can be a respective position on the content page 10 as well as a respective size and dimension of each predetermined ad placement area 12.

Figure 2:
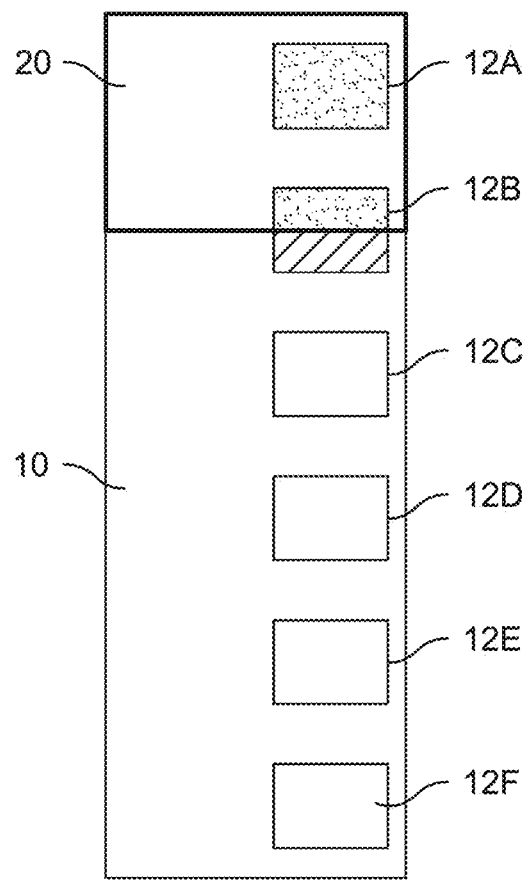
FIG. 2 is a schematic of an exemplary content page with advertising content and a display screen according to one or more embodiments.

FIG. 2 illustrates schematically a circumstance wherein the content page 10 has been downloaded to a viewer computing device and is partially in view in the viewable area 14 of the viewer's screen. A portion of the content page 10 is rendered by a browser operating on the computing device in a browser window or viewport 20 which in this example fills the whole of the computing device screen. As shown in FIG. 2, predetermined ad placement space 12A is in view in the viewport 20 on the viewable area 14. As also shown in FIG. 2, predetermined ad placement space 12B is only partially viewable in the viewport 20. Also, in FIG. 2, predetermined ad placement ad spaces 12C-12F are not in view in the viewport 20. In embodiments of the present invention ad content 22 is downloaded to the viewer's computing device and rendered in certain of the predetermined ad placement spaces of content page 10. Ad content 22 may be downloaded to the content page 10 according to a variety of protocols, methods or techniques. In some embodiments, ad content 22 for a large portion or even all the predetermined ad placement spaces 12 are downloaded at once. In other embodiments, such as "lazy-load", ad content 22 may be downloaded only when the predetermined ad placement spaces 12 are in the viewport 20 or within a predetermined distance outside the viewport 20. In the schematic of FIG. 2, ad content 22A has been downloaded and rendered in predetermined ad placement space 12A and ad content 22B has been downloaded and rendered in predetermined ad placement area 12B. As shown in FIG. 2, ad content 22A is fully visible within the viewport 20 and ad content 22B is only partially visible in the viewport 20. In FIGS. 1-6 of this specification, ad content 22 which is downloaded to the content page 10 and which is in the viewport 20 is shown in grey fill—such as shown in FIG. 2 as ad content 22A and an upper portion of ad content 22B. Also, ad content 22 which is downloaded to the content page 10 but which is not in the viewport is shown in cross-hatch as shown in FIG. 2 as the lower portion of ad content 22B. Ad content 22 which has not yet been downloaded to the content page 10 is shown in FIG. 2 as blank areas 12C-12F. The grey fill is illustrated with stipling in these figures.

Figure 3:
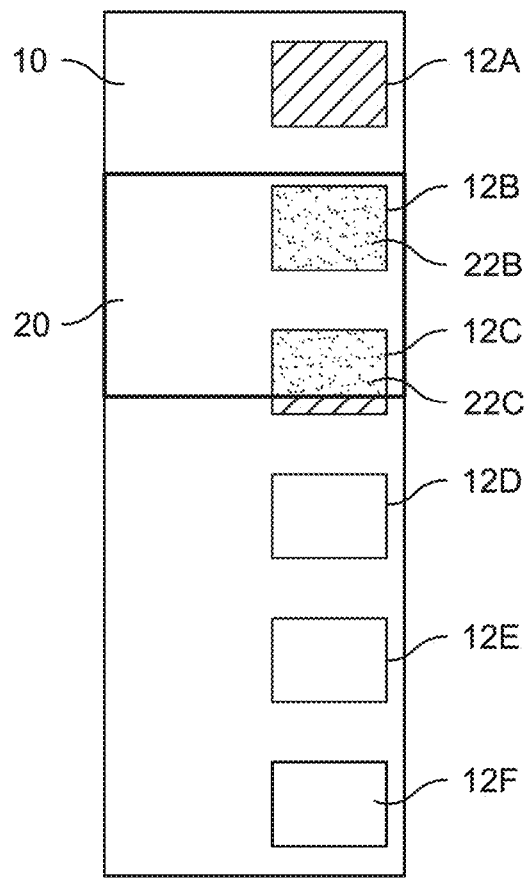
FIG. 3 is a schematic of an exemplary content page with advertising content and a display screen according to one or more embodiments.

In many instances, the viewer of the computing device may scroll down the content page from the position shown in FIG. 2 to a position such as is shown schematically in FIG. 3. In FIG. 3, it can be seen that ad content 22B is now fully visible or viewable in the viewport 20 while ad content 22C which has been downloaded and rendered in predetermined ad placement space 12C is only partially viewable in viewport 20.

Figure 4:
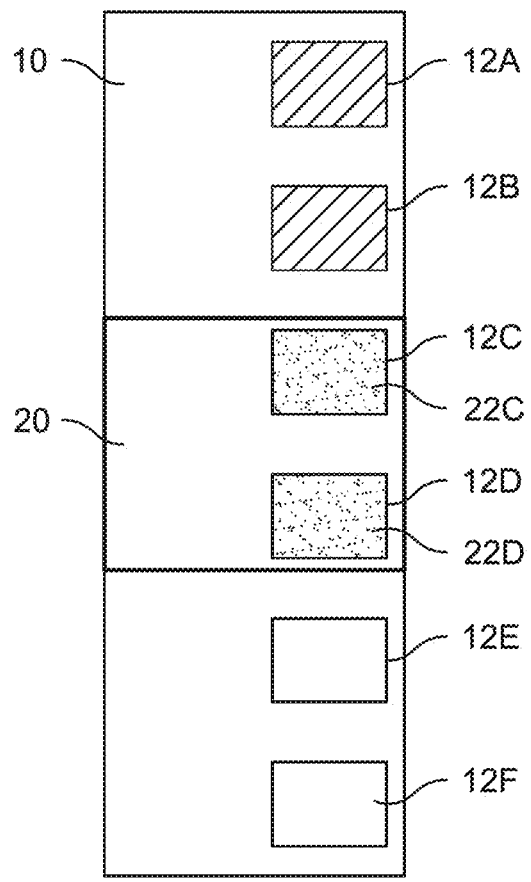
FIG. 4 is a schematic of an exemplary content page with advertising content and a display screen according to one or more embodiments.

FIG. 4 shows, schematically, the same ad content page 10 as the viewer may have scrolled further "down" the content page 10 from the position shown in FIG. 3. In FIG. 4, ad content 22C is fully visible as is ad content 22D which has been downloaded and rendered in predetermined ad placement area 12D.

It is one objective of certain advertising campaigns and systems to maximize the amount of time that the entire, or at least a predetermined portion of, ad content 22 of a predetermined ad placement space 12 is within the viewport 20. In some embodiments, for example, it is preferred that at least 50 percent of the ad content 22 is within the viewport 20 for at least one second.

It is often the case that a viewer may scroll down a content page 10 so quickly that one or more of the ad contents 22 are not within the viewport 20 for the desired predetermined time period. It is often regarded that this has a less than desired advertising affect. Certain embodiments of the present invention provide a number of solutions to this problem. In certain embodiments aspects of the present invention will identify, track and/or monitor the predetermined ad placement areas 12 and/or the rendered ad contents 22 of a content page 10. As a viewer scrolls down the content page 10 if a particular ad content 22 has not been within the viewport 20 for a predetermined desired time, aspects of the invention may "detach" the ad content 22 from the content page 10 and position the ad content at or near the top of the viewport 20 for a desired necessary period of time before the ad content 22 is "reattached" to the content page 10 at its respective predetermined ad placement area 12 even if that predetermined ad placement area 12 has been scrolled out of the viewport 20. In such cases the ad content 22 may be said to "linger" at or near the top of the viewport 20 until "reattached" to the content page 10 at the respective predetermined ad placement area 12.

Figure 5:
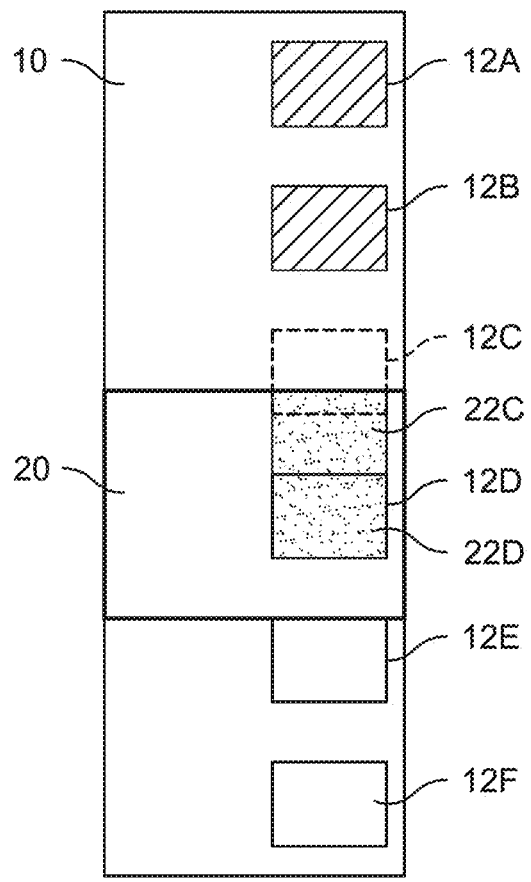
FIG. 5 is a schematic of an exemplary content page with advertising content and a display screen according to one or more embodiments.

Such an embodiment is shown schematically in FIG. 5 which shows that the viewer has scrolled further "down" content page 10 from the position shown in FIG. 4 and that predetermined ad placement area 12C (now shown in dotted lines) is to a large degree scrolled up and out of the viewport 20. However, as shown in FIG. 5, ad content 22C has been detached from predetermined ad placement area 12C and has been positioned at or near the top of the viewport 20 (such as immediately below the browser navigation bar). Ad content 22C, according to this embodiment of the invention, is held in this position ("lingering" in the viewport 20) until a predetermined period of time has passed that ad content 22C has been in the viewport 20 after which ad content 22C is removed from its "lingering" position at or near the top of the viewport 20 and can be returned to predetermined ad placement area 12C, or simply removed from the viewport 20, or reattached to predetermined ad placement area 12C, or otherwise treated.

In some embodiments, when ad content 22C is detached from predetermined ad placement area 12C, a transparent (or other colored) holder of the space occupied by ad content 22C is placed in predetermined ad placement area 12C at least in part to maintain page structure integrity for content page 10 while ad content 22C is detached from predetermined ad placement area 12C to "linger" at or near the top of the viewport 20.

In some embodiments the detached ad content (such as ad content 12C) need not be positioned at or near the top of the viewport 20. It may, instead, be positioned (to "linger") at any other position in the viewport 20, particularly as may be desired to accomplish or reach a state that the ad content has been within the viewport 20 for a predetermined period of time.

Figure 6:
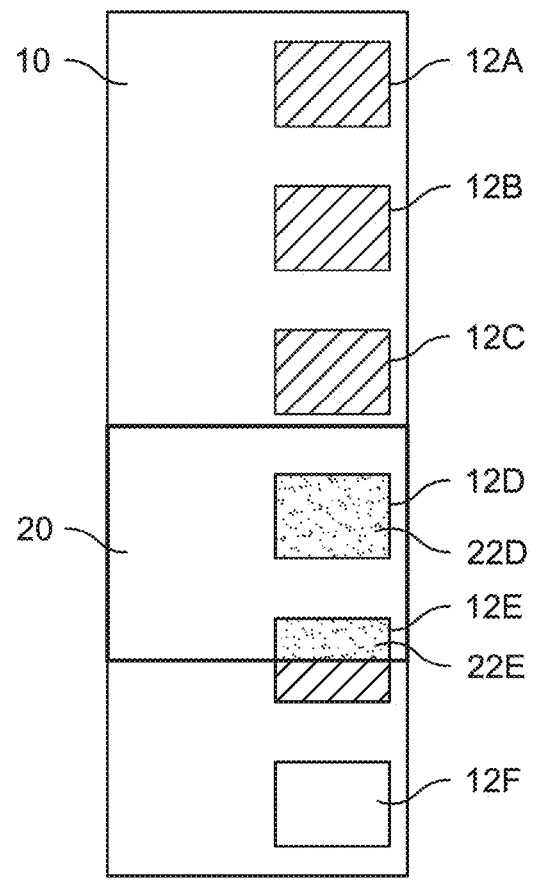
FIG. 6 is a schematic of an exemplary content page with advertising content and a display screen according to one or more embodiments.

FIG. 6 shows the same content page 10 as the viewer continues to scroll down from the position shown in FIG. 4 and FIG. 5. As shown, predetermined ad placement area 12C is outside the viewport 20. Ad content 22C may have been returned to predetermined ad placement area 12C or otherwise removed from the viewport 20. In FIG. 6, predetermined ad placement area 12D and ad content 22D is fully within the viewport 20 and predetermined ad placement area 12E and ad content 22E which has been downloaded and rendered into predetermined ad placement area 12E is partially within the viewport 20.

Figure 7:
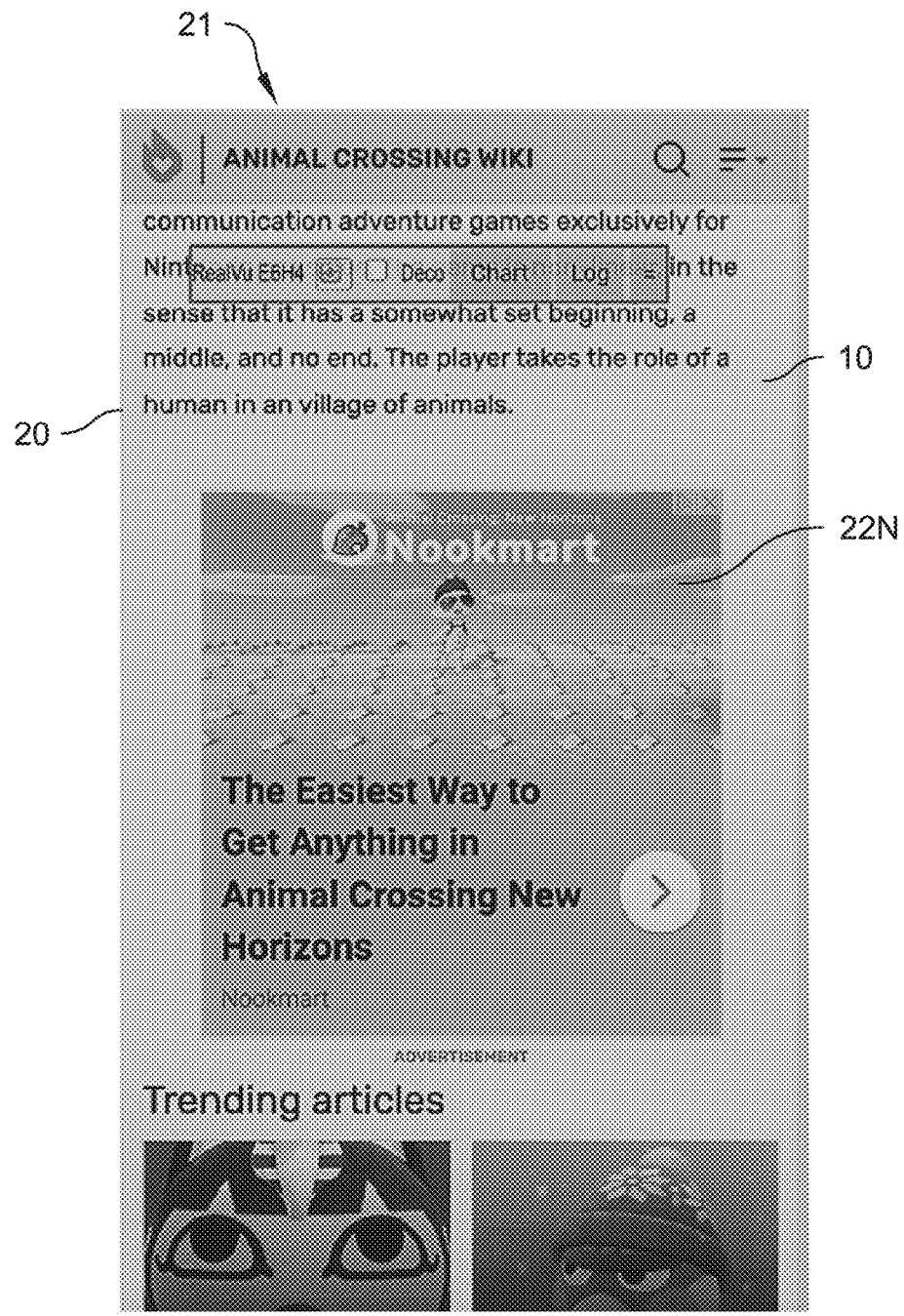
FIG. 7 illustrates an exemplary content page and advertisement according to one or more embodiments.
Figure 8:
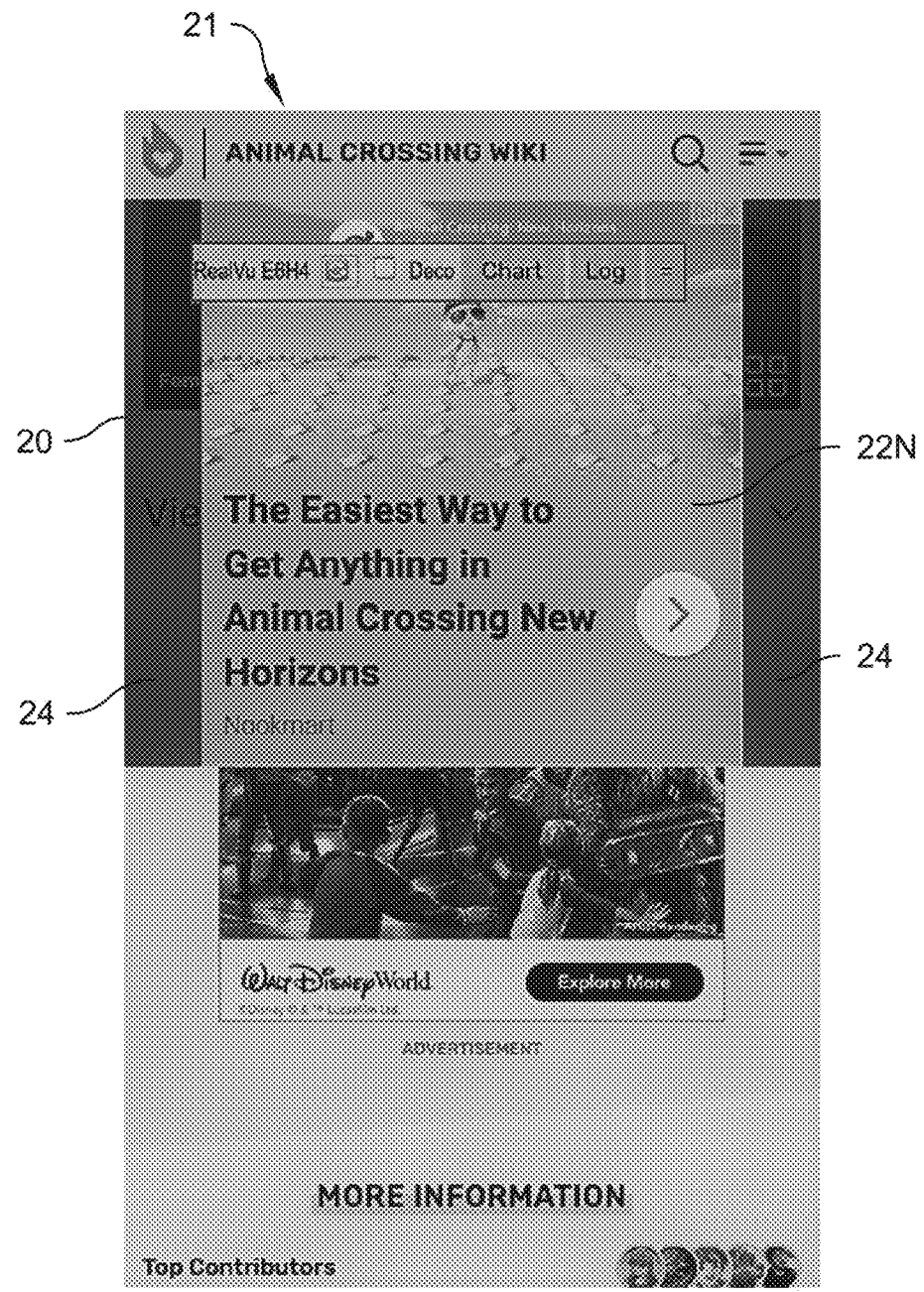
FIG. 8 illustrates an exemplary content page and advertisement according to one or more embodiments.

In some embodiments, ad content 22 to which the "linger" effect is to be applied is "detached" from its respective predetermined ad placement area 12 on the content page 10 and is fixed in the viewport 20 directly under the browser navigation bar for a period of time. FIGS. 7 and 8 illustrate an example of such an embodiment. In FIG. 7, an exemplary portion of a viewport 20 shows a browser navigation bar 21, a portion of a content page 10 and an exemplary ad content 22N positioned on the content page 10. FIG. 8 shows the same ad content 22N to which the "linger" effect has been implemented. Content page 10 has scrolled "up" in the viewport 20, but ad content 22N has been positioned below the navigation bar 21 and a gray semi-transparent rectangle 24 is added under the ad content 22N. After the ad content 22N has been in the viewport 20 for a predetermined period of time, in certain embodiments, the ad content 22N is smoothly moved up out of the viewport 20, and in some cases under the layer of the navigator bar 21, to position the ad content 22 on the content page 10 at its original predetermined ad placement area 12N. The movement of ad content 22N to its position below the navigation bar 21 and its later movement to its original position 12N can be custom controlled to enhance the viewer experience, sometimes sliding smoothly from position to position. Other animation features can also be used or applied.

In some embodiments of the present invention the objects and methods of the invention are achieved by code operating on the viewer computing device. The code may be linked to or downloaded in conjunction with the content page 10. The code may be linked to, work in conjunction with, or comprise a portion of the browser. The system and methods, achieved by the code may comprise, inter alia, the elements of:

a. identifying the predetermined ad content placement areas 12 of the content page 10;
   b. tracking the positioning of the predetermined ad content placement areas 12 vis a vis the viewport 20;
   c. tracking the time that each ad content 22 is in view (and what proportion of the ad content 22 is in view);
   d. making a determination whether apply the "linger" effect to any particular ad content 22;
   e. implementing the "linger" effect to the particular ad content 22;
   f. detaching the ad content 22 from its predetermined ad placement area 12;
   g. rendering the ad content 22 at a predetermined position in the viewport 20 such as below the navigation bar 21 of the viewport 20;
   h. tracking the time that the ad content 22 is in view in regular and/or linger phases;
   i. tracking the time that the ad content 22 is rendered with "linger" effect in the viewport 20;
   j. determining to terminate the "linger" rendering of the ad content 22;
   k. transitioning the ad content 22 from its "linger" positioning to its original predetermined ad placement area 12;

l. recording the time that the ad content 22 was in the viewport 20.

A number of factors may be applied to determine whether to apply the "linger" effect to a particular ad content 22. In some embodiments, the "linger" effect may be applied to all ad content 22 which has not been in the viewport 20 for a predetermined time before it is about to be scrolled out of the viewport 20. In some embodiments, certain predetermined ad placement areas 12 may be flagged by a customer or other party to be tracked and treated with the "linger" effect if the ad content 22 of those ad placement areas 12 have not been in the viewport 20 for a predetermined time prior to being proximately scrolled out of the viewport 20, then the "linger" effect is applied to the ad content 22. In some embodiments, the system can be provisioned such that it tracks the identity of the advertiser for each or certain ad contents 12 and applies the "linger" effect to the ad contents 12 of specified advertisers, including pursuant to respective predetermined times and/or "linger" times specified by particular advertisers.

In some embodiments the system may track the time that each ad content 22 is within the viewable area 14. In some embodiments the time tracked is applied only when the ad is 100% within the viewport 20. In some embodiments, such as for relatively smaller dimension ad contents 22, the time in view accounted to the ad content may be accounted so long as at least 50% of the ad content 22 is within the viewport 20. In some embodiments, such as for relatively larger dimensional ad contents 22, the time in view accounted to the ad content may be accounted so long as at least 30% of the ad content 22 is within the viewport 20. In some embodiments a total time in view is counted as the time that a particular ad content 22 has a specified percentage of the ad content 22 within the viewport 20 plus the time that the ad content 22 is rendered in the "linger" position. Varying instructions may be applied for particular advertisements or advertisers to achieve the total time in view desired by the publisher or advertiser.

In some embodiments, only a certain number of ad contents 22 may be used for "linger" effect per content page 10. In some embodiments a specified period of viewing time of the content page must pass from a first "linger" ad placement before a second ad content 22 is authorized to be subject to the "linger" effect. In some embodiments, a specified minimum "linger" time is applied (such as 2 to 3 seconds) to avoid a sensed "jitter" effect for the viewer.

In some embodiments, the ad content 22 may be detached from the content page 10 and rendered in a specified "linger" position in the viewport 20 with the dimensions it originally had in its respective predetermined ad placement area 12. However, in some embodiments the dimensions of the ad content 22 may be changed, either enlarged or reduced or otherwise changed, when the ad content 22 is detached from the content page 10 and rendered in the "linger" position. In some embodiments, when a particular ad content 22 is determined appropriate to be handled by the "linger" effect, the ad content 22 can be changed as it is rendered in the "linger" position. For example, certain aspects of the ad content 22 can be eliminated or deleted from the ad content 22. In other embodiments, additional ad content not initially rendered when the ad content 22 is in the predetermined ad placement area 12 is included in the rendering when the ad content 22 is rendered in the "linger" position—thus the "linger" ad shows aspects not shown in the initial ad rendered in the respective predetermined ad placement area 14.

In some embodiments, one or more signals may be sent to servers indicating the identity of specific ad content 22 or advertisers of the specific ad content 22 (or other information relating to the specific ad content 22) and instructions can be received at the viewer computing device in response to the signals sent to the servers. For example, the signals sent to the servers may identify the ad content 22, advertiser, or time of the ad content 22 in the viewport 20, or other information, and in response one or more servers may instruct the viewer computing device to apply the "linger" effect to the ad content 22 (even if such instruction was not in effect prior to the instruction from the servers). At the one or more servers, the advertiser of a specific ad content 22 may be notified of the status of the ad content 22 in the viewport 20 and the advertiser may elect to pay additional fees to apply the "linger" effect to the specific ad content 22 and appropriate instructions may be sent from one or more servers to the user computing device such that a "linger" effect rendering of the ad content 22 is accomplished for a period of time including in some cases a period of time specified in the instructions received from the one or more servers. In some embodiments, the advertiser of a specific ad content may be notified of signals from the user computing device and the advertiser may pay an extra fee and provide a substitute ad content 22sub to be rendered in the "linger" position in substitution of the original ad content 22.

In some embodiments, ad content 22 is initially rendered on a content page 10, usually in conjunction with a respective predetermined ad placement area 12, and its movement in the viewport 20 is controlled in conjunction with the movement of the content page 10 in the viewport 20. In this condition, when the content page 10 is scrolled "up", the ad content 22 is scrolled up. In this condition, according to some embodiments, the controlling position parameters for the ad content 22 are the position parameters based on the content page 10 position/parameter system and the HTML mode settings for the ad content 22 location may be "default".

In some embodiments of the present invention the "linger" effect can be accomplished while leaving the ad content 22 position parameter system as part of the content page 10 parameter system and changing the particular position parameters of the ad content 22 vis a vis the content page 10 as the content page 10 is scrolled or moved in the viewport 20. In some embodiments, the "linger" effect can be accomplished while transferring position control of the ad content 22 to the positioning system of or applying to the viewport 20. In such instances, after the determination has been made to treat the particular ad content 22 with the "linger" effect, the ad content 22 is essentially or figuratively detached from the content page 10 and position control of the ad content 22 is transferred to the browser which positions the "lingering" ad content 22 with position parameters vis a vis the viewport 20 instead of positioning the ad content 22 according the positioning parameters of the content page 10. In some such instances the ad content 22 position is set by a designation of Position: "fixed" in the browser. After the "linger" effect is accomplished for a satisfactory period of time, the browser coordinate system can be used to animate the removal of the ad content 22 and any associated graphics (such as shadow boxing) until the ad content 22 is returned to the control of the positioning system of the content page 10 and the ad content 22 again positioned in its respective predetermined ad placement area 12 (even though the predetermined ad placement area 12 may at that time be outside the viewport 20. Thus, if the content page 10 is scrolled in an opposite direction, the ad content 22 would be shown in its initial position (predetermined ad placement area 12) on the content page 10.

In some embodiments, a placeholder, either transparent or otherwise, may be positioned in the predetermined ad placement area 12 corresponding to ad content 22 to which the "linger" effect is to be applied. The placeholder may provide content page 10 structural integrity or other benefits while the ad content 22 is essentially removed from the predetermined ad placement area 12 and positioned in its "linger" position. After the "linger" effect has been completed, the ad content 22 may be returned to the content page 10 in the predetermined ad placement area 12 and the placeholder removed. The placement and removal of the placeholder can be simultaneous with the detachment and reattachment of the ad content 22 so as to maintain the integrity of content page 10.

Additionally, in some embodiments additional graphic effect is added adjacent to and/or underneath the ad (such as a gray semi-transparent rectangle).

The ad content 22 may comprise any type of media, including photographic media, graphic media, video, audio or other content. In some embodiments, the content page 10 may be a continuous page with "lazy loading" content appearing at the bottom of the page as long as the viewer continues to scroll down to the apparent bottom of the content page 10. In such cases, the "linger" effect may be applied to any ad content 22 provided into the lazy loaded content.

In some embodiments of the present invention, when ad content 22 is detached from its respective underlying predetermined ad placement area 12, the position parameters of the ad content 22 are modified such that the advertisement (or a portion or predetermined portion of the advertisement) is retained in the viewport 20 even while the associated (underlying) content page 10 is scrolled out of the viewable area 14. In this fashion the advertisement (or a predetermined portion of the advertisement) can be retained in the viewport 20 for a predetermined period of time even if the related portions of the content page 10 are or have been scrolled out of the viewport 20.

In certain embodiments HTML objects on a content page or in a viewport 20 may be oriented or located by position parameters. In some cases the position parameters may position the HTML object in a specified position versus the content page. In other cases the position parameters may position the HTML object in a specified position versus the viewport 20.

In some embodiments of the present invention an advertisement may be positioned on a content page by position parameters addressing the content page. As the content page is scrolled up and nears the top of the viewport 20, the particular advertisement (HTML object) may be switched from content page parameter control to viewport parameter control. In this fashion the HTML object is handed off to code that keeps the HTML object in view in the viewport for a predetermined time, in some embodiments by maintaining position parameters addressing the viewport dimensional parameters. After a predetermined period of time with the HTML object thus held in view in the viewport, the HTML object may be "released" from viewport parameter control and returned to content page parameter control and moved partially or completely outside the viewport 20 depending on the vertical position of the content page.

Accordingly, for the specified period of time, the HTML object may be described as "lingering" in the viewport. This phenomena in some embodiments is termed a "linger" effect.

In some embodiments it is helpful to replace the HTML object which is shifted to viewport parameter control with a "filler" (in some instances, empty or transparent) HTML object which in some embodiments may serve to hold the positional structure of other portions of the content page while the "lingering" HTML object is held in the defined position of the viewport 20. In some such embodiments the "filler" HTML object is not viewable in the viewport because the "lingering" HTML object is rendered on a top layer in the viewport and thus is viewable instead of the "filler" HTML object.

In some embodiments, a second HTML object is also generated to be displayed in relation to the "lingering" HTML object for several reasons including enhancing the viewer experience and drawing attention to the "lingering" HTML object.

Figure 9:
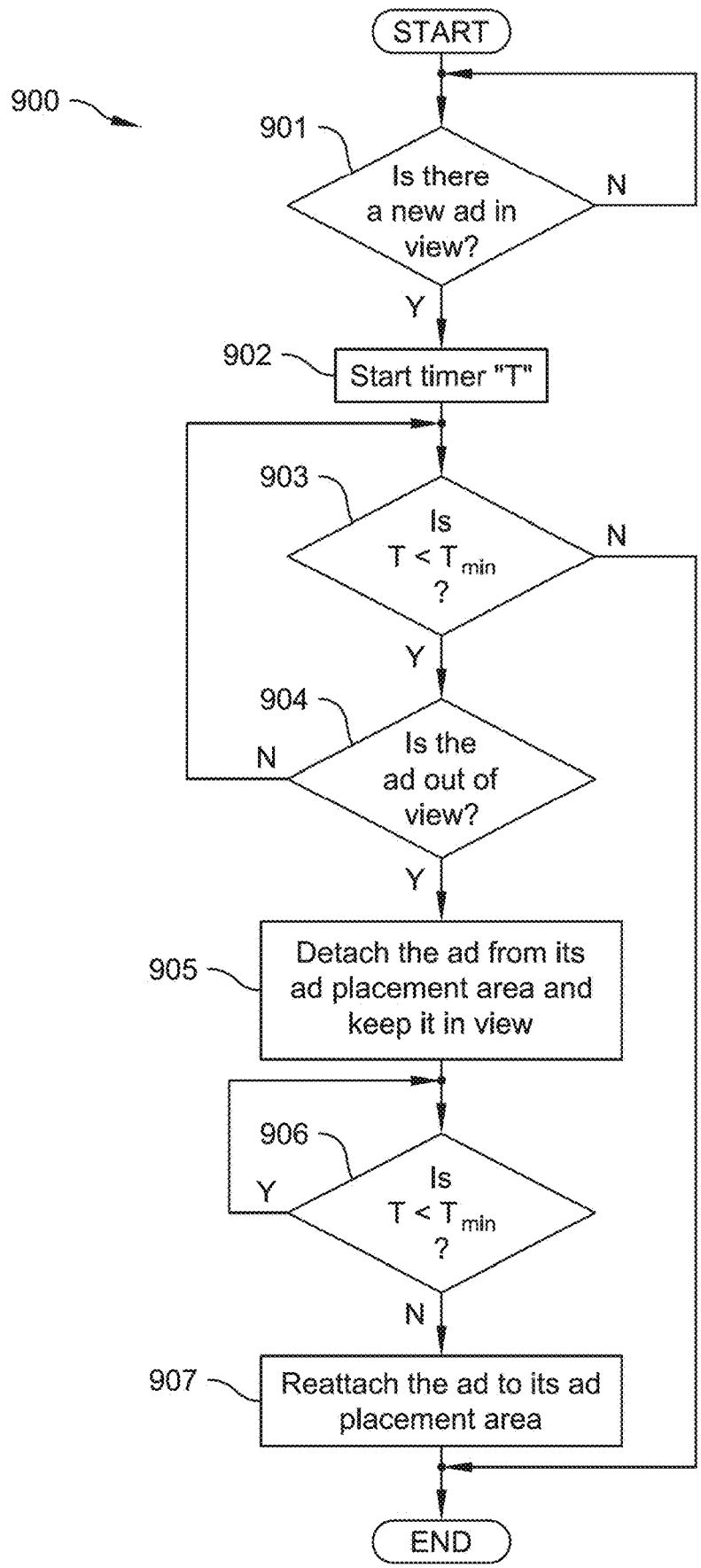
FIG. 9 is a flowchart in accordance with one preferred embodiment of the present invention.

FIG. 9 is a flowchart 900 of one preferred embodiment of the present invention which illustrates in flowchart form what is described above with respect to FIGS. 1-8. The flowchart refers to actions taken with respect to ad content that is designated to appear in a viewport for at least a predetermined minimum amount of time. The process shown in the flowchart operates as follows:

STEP 901: Is there a new ad in view? ("in view" means that the ad is visible in the viewport). If "no," keep checking to see if there is a new ad in view.

STEP 902: If a new ad is in view, start a timer "T."

STEP 903: Is $T<T_{min}$? ($T_{min}$ is a minimum "in view" time). If "no," then the process ends.

STEP 904: If $T<T_{min}$, is the ad out of view? If "no," keep checking to see if $T<T_{min}$ and the ad is out of view.

STEP 905: If the ad is out of view, detach the ad from its ad placement area and keep it in view.

STEP 906: Is $T<T_{min}$? If "yes," keep checking to see if $T<T_{min}$.

STEP 907: If T is not less than $T_{min}$, reattach the ad to its ad placement area. If this ad placement area is no longer in the viewport, this results in the ad content disappearing from the viewport. However, if the viewer happened to scroll backwards through the web content page, it is possible that the ad placement area will reappear in the viewport, and thus the ad content may reappear within the ad placement area, but not in the location that it was originally positioned in during the detachment process described in STEP 905.

Additional Considerations

A. Unpopulated Ad Placement Areas

As discussed above, in some scenarios, latency issues caused by ad auctions, ad servers, and the ad delivery processes may even prevent the ad content from populating the ad placement space at all before the viewer has scrolled past the ad placement space. In this scenario, the advertiser has also paid to have the ad delivered, but the ad was never actually exposed to the viewer, even for a brief period of time so no viewable ad impression is made. In one embodiment, the process may just ignore such ad content and not treat it according to the "linger" effect. In an alternative process, an ad placement area that has been scrolled out of the viewport before it can be populated with rendered ad content may be treated in accordance with the "linger" effect as follows:

STEP 1: Detect whether an ad placement area has been scrolled out of the viewport before it can be populated with rendered ad content.

STEP 2: If so, change the "position" property of the ad placement area so that it does not scroll with the web content page, but rather takes a fixed position inside the viewport. This requires changing the CSS (cascading style sheet) position property from position:static to position:fixed.

STEP 3: Maintain (linger) the ad placement area in the fixed position inside the viewport for a predetermined amount of time that is sufficient to (i) address the latency issues for the majority of use cases, and (ii) provide a viewable ad impression if or when ad content is eventually received and rendered in the ad placement area (referred to herein as "subsequently rendered ad content"). Suitable time amounts may be in the non-limiting range of 2-5 seconds. This provides for a minimum of 1 second due to latency and a minimum of 1 additional second (which must be continuous) to satisfy industry requirements (e.g., Media Rating Council) for a viewable impression. A maximum waiting period is established that is sufficient to address latency issues for the majority of use cases, and is also referred to herein as an "ad content rendering time period."

Thus, in one preferred embodiment, the ad placement area is maintained in the fixed position in the viewport for a total amount of time that is at least equal to the sum of (A) the predetermined minimum amount of time that ad content for a particular ad placement area of the web content page is to appear in the viewport, and (B) the ad content rendering time period. During this total amount of time, the ad placement area is populated with subsequently rendered ad content that is associated with the particular ad placement area, assuming such ad content exists as a result of ad content being previously sold for the ad placement area. The subsequently rendered ad content thereby lingers in the viewport for at least the predetermined minimum amount of time.

STEP 4: After the predetermined amount of time has expired, deactivate the linger effect by changing the "position" property of the ad placement area back to its initial value. This requires changing the CSS position property from position:fixed back to position:static. Assuming that the ad placement area is still out of the viewport, this will result in the ad content disappearing from the viewport.

It may also not be known whether ad content was sold for the ad placement area. That is, there are two potential scenarios when the ad placement space is unpopulated while it is in the viewport. First, latency issues may have prevented the ad placement space from being populated. Second, the ad placement space may not have been sold at all and no ad content would have populated the ad placement space. Both scenarios are treated in a similar manner via the ad placement area which lingers in the viewport for the predetermined amount of time which is sufficient to address the time delays resulting from latency issues and to allow ad content that eventually is received by the browser to be rendered in the ad placement area for a sufficient period of time to provide a viewable ad impression.

In one preferred embodiment, the ad placement area may appear as transparent empty space in the designated location within the viewport. In this manner, it does not distract the viewer from the web content unless or until the ad content is rendered.

In one preferred embodiment, Step 1 includes an additional substep of detecting whether the ad placement area has been in the viewport with no ad content rendered therein for at least the ad content rendering time period. If so, it is presumed that no ad content was sold for this ad placement area and accordingly, it is not necessary to perform this process at all.

In this embodiment, there is no detachment of the ad content from, or reattachment of the ad content to, the ad placement area because the position property of the ad placement area is used to cause the linger effect.

Similar to the embodiments above, the linger effect for this embodiment may be designated to occur only for particular ad placement areas, or for all ad placement areas.

B. Displaying of Ad Content that has not Yet Appeared in the Viewport

In an alternative embodiment, the "linger" concept may be employed for displaying ad content in the viewport for ad content associated with ad placement spaces that have not yet, or will never, appear in the viewport during viewing of a web content page.

Consider, for example, ad placement spaces 12E and 12F in FIGS. 2-4 which have not yet appeared in the viewport. If the viewer stops scrolling and/or navigates away from the web content page, neither of these ad placement spaces will appear in the viewport, and thus any ad content designated to be rendered in such ad placement spaces will not be viewed by the viewer. In fact, it is well-known in the art that ad content which is populated into ad placement spaces near the top portion of a web content page has a significantly higher chance of receiving a viewable ad impression than ad content which is populated into ad placement spaces near the bottom portion of a web content page. This is especially true when the web content page is very long since the viewer may even be less likely to scroll through the entirety of a very long web content page than a short web content page. This alternative embodiment provides a technology solution to this problem.

In operation, the process operates as follows:

STEP 1: Detect whether ad content has been rendered in an ad placement space of a web content page that is below the bottom edge of the viewport and which has not yet been scrolled into the viewport. For example, referring to FIGS. 2-4, this may be ad content rendered in ad placement spaces 12E and/or 12F.

STEP 2: If so, detach the ad content from the ad placement space and bring the ad content into the viewport and place it in a fixed location of the viewport, such as at or near the bottom edge of the viewport, and allow the ad content to linger in this location for a sufficient period of time to provide a viewable ad impression. After this period of time, the ad content then disappears from the viewport and the ad content is reattached to its ad placement space.

STEP 3: Repeat steps 1 and 2 for additional ad content that meets the requirements set forth in step 1 in a sequential manner until all such ad content has been shown.

If or when the viewer scrolls down the web content page to bring the remaining portions of the web content page into the viewport, the respective reattached ad content appears in its original ad placement space. Thus, it may be possible that certain ad content is viewed twice while viewing a web content page once as a result of the step 2 process, and again as a result of normal viewing of the web content page.

This additional linger feature may be used in conjunction with the linger feature described in FIGS. 1-8. If so, ad content that is shown in the viewport during step 2 is not treated in accordance with the linger feature described in FIGS. 1-8 because the ad content already received a viewable ad impression. When used together, the linger location for the ad content that has not yet appeared in the viewport may be at or near the bottom edge of the viewport to avoid interfering with a linger location at or near a top edge of the viewport that may be used for the linger feature described in FIGS. 1-8.

When using this additional linger feature, a grey semi-transparent background may appear under the ad content so that portions of the web content page below the ad content are at least partially visible to the viewer.

When using this additional linger feature, the ad content may appear all at once, or the ad content may appear in a submarine-type manner, slowly appearing into the bottom edge of the viewport, lingering in the viewport for a predetermined period of time, and then sinking back down out of the viewport. It is then reattached to its respective ad placement area.

In an alternative embodiment, steps 1-3 may be applied to the ad placement areas regardless of whether ad content has been previously rendered in the respective ad placement areas. In this embodiment, once an ad placement area which has not previously been scrolled into the viewport is allotted its time window for its ad content to appear in the designated location of the viewport, an ad content auction and retrieval process may be instantly initiated and the winning ad content immediately populates the designated location for the designated period of time until it disappears and is attached to the ad placement area. In this scenario, there is no detachment or reattachment process since the ad content is initially rendered in the designated location of the viewport, not in the ad placement area.

This additional linger feature may also be used in place of the linger feature described in FIGS. 1-8.

Figure 10A:
FIGS. 10A-10C illustrate another preferred embodiment of the present invention.
Figure 10B:
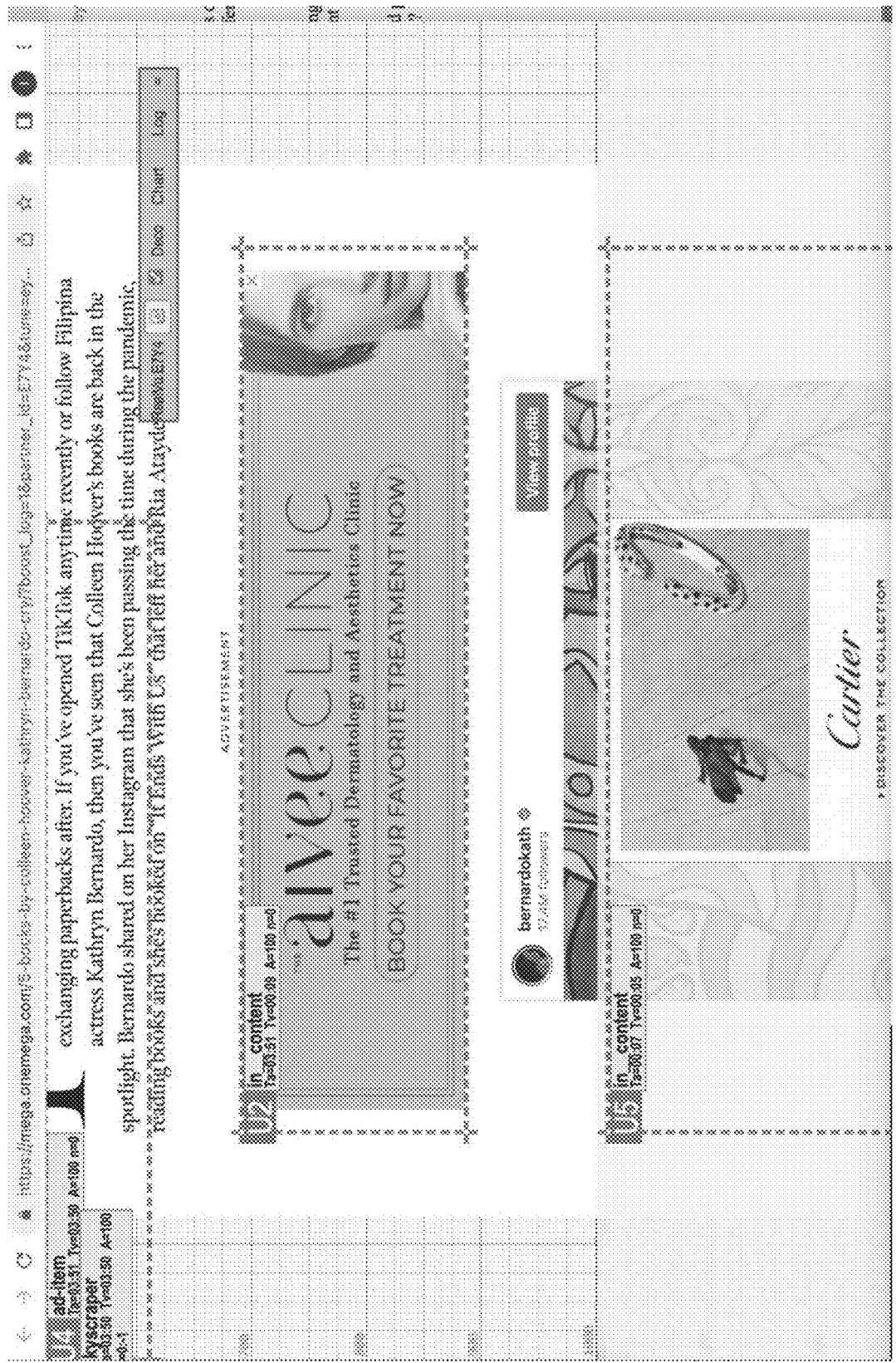
Figure 10C:
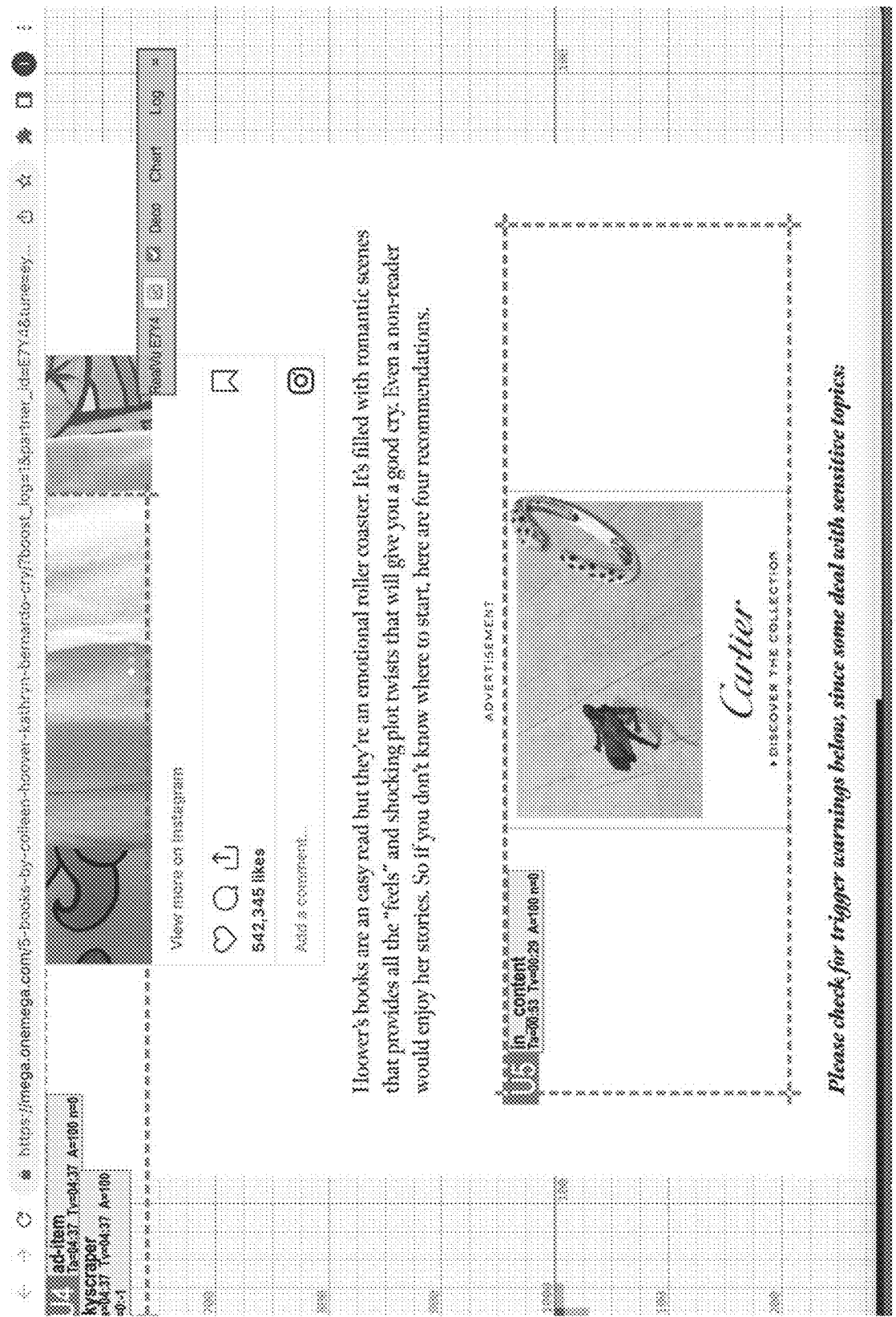

FIGS. 10A-10C illustrate one preferred embodiment of this additional linger feature. In this embodiment, a fixed location near a bottom edge of the viewport is designated to show ad content that is not associated with ad placement areas which have been previously scrolled into the viewport.

FIG. 10A: Viewer is scrolling through a web content page or is presently holding the web content page static at its current location. No ad content appears in a designated fixed location near a bottom edge of the viewport. In this example, two ads appear in the viewport. Ad content U4 is ad content that is currently lingering in the viewport in accordance with the linger feature described in FIGS. 1-8. For example, it may have appeared near the beginning of the web content page but was previously scrolled too fast through the viewport to make a viewable ad impression. Ad content U2 is simply being shown in the normal manner and has not been treated in accordance with any linger feature.

FIG. 10B: It is detected that ad content U5 has been rendered in an ad placement space of a web content page that is below the bottom edge of the viewport and which has not yet been scrolled into the viewport in accordance with step 1 above. Accordingly, the ad content U5 is detached from its ad placement area and the ad content U5 rises up (submarines up) from the bottom of the viewport. In this example, the ad content U5 has the grey semitransparent background described above.

FIG. 10C: The ad content U5 comes to rest in a static location near the bottom of the viewport where it remains for a predetermined period of time that is sufficient qualify as a viewable ad impression. After this period of time, the ad content U5 disappears from the viewport and the ad content U5 is reattached to its ad placement space. The disappearance is not shown in the figures but is self-explanatory. The disappearance may be in the form of the ad content U5 lowering out of (submarining down from) the bottom of the viewport in a reverse process from its initial appearance.

When determining whether an ad placement space has been rendered with ad content (e.g., whether the ad placement space has been sold), one preferred embodiment detects an event which indicates that an ad container was filled. This type of event is available using an API of an ad delivery platform such the GOOGLE ad delivery platform.

Similar to the embodiments above, the linger effect for this embodiment may be designated to occur only for particular ad placement areas that have not yet appeared in the viewport, or for all ad placement areas that have not yet appeared in the viewport.

C. Jitter Reduction

In one preferred embodiment, a minimum amount of time is set for ad content to linger in the viewport so as to avoid the viewer experiencing a jitter effect. Consider the following example:

a. The viewable ad impression time is a minimum of 1.0 second.
b. Ad content is rendered in an ad placement space that is viewable in the viewport for 0.9 seconds before the viewer scrolls the ad placement space out of the viewport.
c. The ad content is then detached from its ad placement area and positioned in a location within the viewport for 0.1 seconds to meet the required minimum viewable ad impression time. If the ad content is removed after 0.1 seconds, the viewer will experience a negative jitter effect due to the sudden appearance and disappearance of the ad content.
d. To minimize this jitter effect, in one preferred embodiment, a minimum amount of time is set for ad content to linger in the viewport, such as 1-5 seconds, regardless of the actual amount of time that the ad content must linger in the viewport to meet the requirements of a viewable ad impression time.

The MRC guidelines require at least 50% of the ad content (50% of the pixels of the ad content) to be in the viewport for at least one continuous second to qualify as a viewable ad impression. Thus, when counting the viewable ad impression time upon application of the linger effect, there are two potential scenarios:

SCENARIO 1: The ad content immediately appears in the linger position with no viewer-perceptible delay (visually perceptible delay). In this scenario, the time of the rendered ad content in the ad placement area may simply be added to the time of the rendered ad in the linger position, and this total time must be at least one second.

SCENARIO 2: The ad content does not immediately appear in the linger position and there is a viewer-perceptible delay (visually perceptible delay). In this scenario, the time of the rendered ad content in the ad placement area cannot be counted, and the ad content must then appear in the linger position for at least one second.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately. Portions of such code for one preferred embodiment is shown in the Appendix.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements. The scope of the present invention thus further includes a tangible computer program product for displaying ad content within a web content page when viewing the web content page in a browser window of a web browser, wherein the computer program product comprises non-transitory computer-readable media encoded with instructions for execution by a processor (including the processor that the software code of the Appendix is embedded into) to perform the methods described above.

Although the invention has been described with reference to specific embodiments, it will be understood by those skilled in the art that various changes can be made without departing from the spirit or scope of the invention. Accordingly, the disclosure of embodiments is intended to be illustrative of the scope of the invention and is not intended to be limiting. It is intended that the scope of the invention shall be limited only to the extent required by the appended claims. To one of ordinary skill in the art, it will be readily apparent that the systems and methods discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of displaying ad content within a web content page that is viewable in a browser window of a web browser, wherein the web content page is scrollable to allow a portion of the web content page to appear in a viewport of the browser window, and wherein the web content page includes a plurality of ad placement areas, and wherein the ad content is populated into respective ad placement areas, and thereby the ad content that is populated into an ad placement area that appears in the viewport of the browser window is normally visible to a viewer of the browser window, and wherein the ad content is initially attached to the web content page, the method comprising:

(a) setting in a memory a predetermined minimum amount of time that ad content for a particular ad placement area of the web content page is to appear in the viewport of the browser window;

(b) detecting when the ad content for the particular ad placement area has been rendered and has not yet appeared in the viewport of the browser window; and (c) upon detecting that the ad content for the particular ad placement area has been rendered and has not yet appeared in the viewport of the browser window:

(i) detaching the ad content for the particular ad placement area from the web content page and its respective ad placement area, and (ii) positioning the detached ad content for the particular ad placement area in a location within the viewport of the browser window and maintaining the ad content for the particular ad placement area within the viewport of the browser window for at least the predetermined minimum amount of time regardless of any scrolling of the web content page, the ad content for the particular ad placement area thereby lingering in the viewport of the browser window for at least the predetermined minimum amount of time despite the particular ad placement area not having yet appeared in the viewport of the browser window.

2. A computer program product for displaying ad content within a web content page that is viewable in a browser window of a web browser, wherein the web content page is scrollable to allow a portion of the web content page to appear in a viewport of the browser window, and wherein the web content page includes a plurality of ad placement areas, and wherein the ad content is populated into respective ad placement areas, and thereby the ad content that is populated into an ad placement area that appears in the viewport of the browser window is normally visible to a viewer of the browser window, and wherein the ad content is initially attached to the web content page, the computer program product comprising a computer readable medium tangibly embodying non-transitory computer-executable program instructions thereon that, when executed, cause one or more computing devices to:

(a) set in a memory a predetermined minimum amount of time that ad content for a particular ad placement area of the web content page is to appear in the viewport of the browser window;

(b) detect when the ad content for the particular ad placement area has been rendered and has not yet appeared in the viewport of the browser window; and (c) upon detecting that the ad content for the particular ad placement area has been rendered and has not yet appeared in the viewport of the browser window:

(i) detach the ad content for the particular ad placement area from the web content page and its respective ad placement area, and (ii) position the detached ad content for the particular ad placement area in a location within the viewport of the browser window and maintain the ad content for the particular ad placement area within the viewport of the browser window for at least the predetermined minimum amount of time regardless of any scrolling of the web content page, the ad content for the particular ad placement area thereby lingering in the viewport of the browser window for at least the predetermined minimum amount of time despite the particular ad placement area not having yet appeared in the viewport of the browser window.

3. A system comprising:

(a) a web content page that is viewable in a browser window of a web browser, wherein the web content page is scrollable to allow a portion of the web content page to appear in a viewport of the browser window, and wherein the web content page includes a plurality of ad placement areas, and wherein the ad content is populated into respective ad placement areas, and thereby the ad content that is populated into an ad placement area that appears in the viewport of the browser window is normally visible to a viewer of the browser window, and wherein the ad content is initially attached to the web content page; and (b) instructions in the form of code configured to:

(i) set in a memory a predetermined minimum amount of time that ad content for a particular ad placement area of the web content page is to appear in the viewport of the browser window;

(ii) detect when the ad content for the particular ad placement area has been rendered and has not yet appeared in the viewport of the browser window; and (iii) upon detecting that the ad content for the particular ad placement area has been rendered and has not yet appeared in the viewport of the browser window:

(A) detach the ad content for the particular ad placement area from the web content page and its respective ad placement area, and (B) position the detached ad content for the particular ad placement area in a location within the viewport of the browser window and maintain the ad content for the particular ad placement area within the viewport of the browser window for at least the predetermined minimum amount of time regardless of any scrolling of the web content page, the ad content for the particular ad placement area thereby lingering in the viewport of the browser window for at least the predetermined minimum amount of time despite the particular ad placement area not having yet appeared in the viewport of the browser window.

* * * * *